(12) United States Patent
Fox et al.

(10) Patent No.: US 12,050,937 B2
(45) Date of Patent: Jul. 30, 2024

(54) PREVENTING RESOURCE EXPLOITATION IN MOBILE DEVICES

(71) Applicant: INTERNATIONAL BUSINESS MACHINES CORPORATION, Armonk, NY (US)

(72) Inventors: Jeremy R. Fox, Georgetown, TX (US); Martin G. Keen, Cary, NC (US); Abhishek Jain, Baraut (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 437 days.

(21) Appl. No.: 17/448,296

(22) Filed: Sep. 21, 2021

(65) Prior Publication Data
US 2023/0088294 A1 Mar. 23, 2023

(51) Int. Cl.
*G06F 9/50* (2006.01)

(52) U.S. Cl.
CPC .................................. *G06F 9/5055* (2013.01)

(58) Field of Classification Search
None
See application file for complete search history.

(56) References Cited

U.S. PATENT DOCUMENTS

| | | |
|---|---|---|
| 7,903,027 B2 | 3/2011 | Thandu |
| 8,155,625 B2 | 4/2012 | Morgan |
| 8,655,307 B1 * | 2/2014 | Walker ............... H04W 68/005 455/574 |
| 8,984,581 B2 | 3/2015 | Luna |
| 9,203,864 B2 | 12/2015 | Luna |

(Continued)

FOREIGN PATENT DOCUMENTS

| | | |
|---|---|---|
| KR | 20060122966 A | 11/2006 |
| WO | 2019128571 A1 | 7/2019 |

OTHER PUBLICATIONS

Berrocal, Javier, Jose Garcia-Alonso, Cristina Vicente-Chicote, Juan Hernández, Tommi Mikkonen, Carlos Canal, and Juan M. Murillo. "Early analysis of resource consumption patterns in mobile applications." Pervasive and Mobile Computing 35 (2017): 32-50. (Year: 2017).*

(Continued)

*Primary Examiner* — Frank D Mills
(74) *Attorney, Agent, or Firm* — Jeffrey M. Ingalls

(57) ABSTRACT

A method, system, and computer program product for preventing resource exploitation in mobile devices are provided. The method receives a resource request from a mobile application stored on a mobile computing device. A device context is determined for the mobile computing device. A resource consumption context is determined for the mobile computing device based on the device context and resource consumption of one or more mobile applications operating on the mobile computing device. In response to the resource request, the method generates a set of resource consumption profiles based on the device context and the resource consumption context. A resource consumption profile is selected for the mobile application from the set of resource consumption profiles. The method manages consumption of resources, of the mobile computing device, by the mobile application based on the selected resource consumption profile.

17 Claims, 6 Drawing Sheets

(56) References Cited

U.S. PATENT DOCUMENTS

| | | |
|---|---|---|
| 10,681,572 B2 | 6/2020 | Bostick |
| 2007/0254631 A1 | 11/2007 | Spooner |
| 2012/0221651 A1* | 8/2012 | Rabii ................. H04L 51/58 |
| | | 709/206 |
| 2013/0031191 A1 | 1/2013 | Bott |
| 2016/0150072 A1* | 5/2016 | Rangarajan ....... H04W 52/0254 |
| | | 455/574 |
| 2017/0177255 A1 | 6/2017 | Xie |
| 2018/0152471 A1* | 5/2018 | Jakobsson ........... H04L 63/1425 |
| 2019/0356659 A1 | 11/2019 | Eisen |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

PREVENTING RESOURCE EXPLOITATION IN MOBILE DEVICES

BACKGROUND

Mobile computing devices have resources that are limited compared to stationary or other larger computing devices. Mobile computing resources include computing resources, storage or memory space, battery power, and other resources on which mobile computing devices draw to perform operations requested by users. Mobile computing resources are often managed as an attempt to optimize and manage resources using user-selected permissions. Resource permissions are often categorized into differing types. These resource permissions are often selected by users for individual applications. Adjustment or changes to resource permissions are often manually performed by users at an individual application level.

SUMMARY

According to an embodiment described herein, a computer-implemented method for preventing resource exploitation in mobile devices is provided. The method receives a resource request from a mobile application stored on a mobile computing device. A device context is determined for the mobile computing device. A resource consumption context is determined for the mobile computing device based on the device context and resource consumption of one or more mobile applications operating on the mobile computing device. In response to the resource request, the method generates a set of resource consumption profiles based on the device context and the resource consumption context. A resource consumption profile is selected for the mobile application from the set of resource consumption profiles. The method manages the consumption of resources, of the mobile computing device, by the mobile application based on the selected resource consumption profile.

According to an embodiment described herein, a system for preventing resource exploitation in mobile devices is provided. The system includes one or more processors and a computer-readable storage medium, coupled to the one or more processors, storing program instructions that, when executed by the one or more processors, cause the one or more processors to perform operations. The operations receive a resource request from a mobile application stored on a mobile computing device. A device context is determined for the mobile computing device. A resource consumption context is determined for the mobile computing device based on the device context and resource consumption of one or more mobile applications operating on the mobile computing device. In response to the resource request, the operations generate a set of resource consumption profiles based on the device context and the resource consumption context. A resource consumption profile is selected for the mobile application from the set of resource consumption profiles. The operations manage the consumption of resources, of the mobile computing device, by the mobile application based on the selected resource consumption profile.

According to an embodiment described herein, a computer program product for preventing resource exploitation in mobile devices is provided. The computer program product includes a computer-readable storage medium having program instructions embodied therewith, the program instructions being executable by one or more processors to cause the one or more processors to receive a resource request from a mobile application stored on a mobile computing device. A device context is determined for the mobile computing device. A resource consumption context is determined for the mobile computing device based on the device context and resource consumption of one or more mobile applications operating on the mobile computing device. In response to the resource request, the computer program product generates a set of resource consumption profiles based on the device context and the resource consumption context. A resource consumption profile is selected for the mobile application from the set of resource consumption profiles. The computer program product manages the consumption of resources of the mobile computing device by the mobile application based on the selected resource consumption profile.

DETAILED DESCRIPTION

Figure 1:
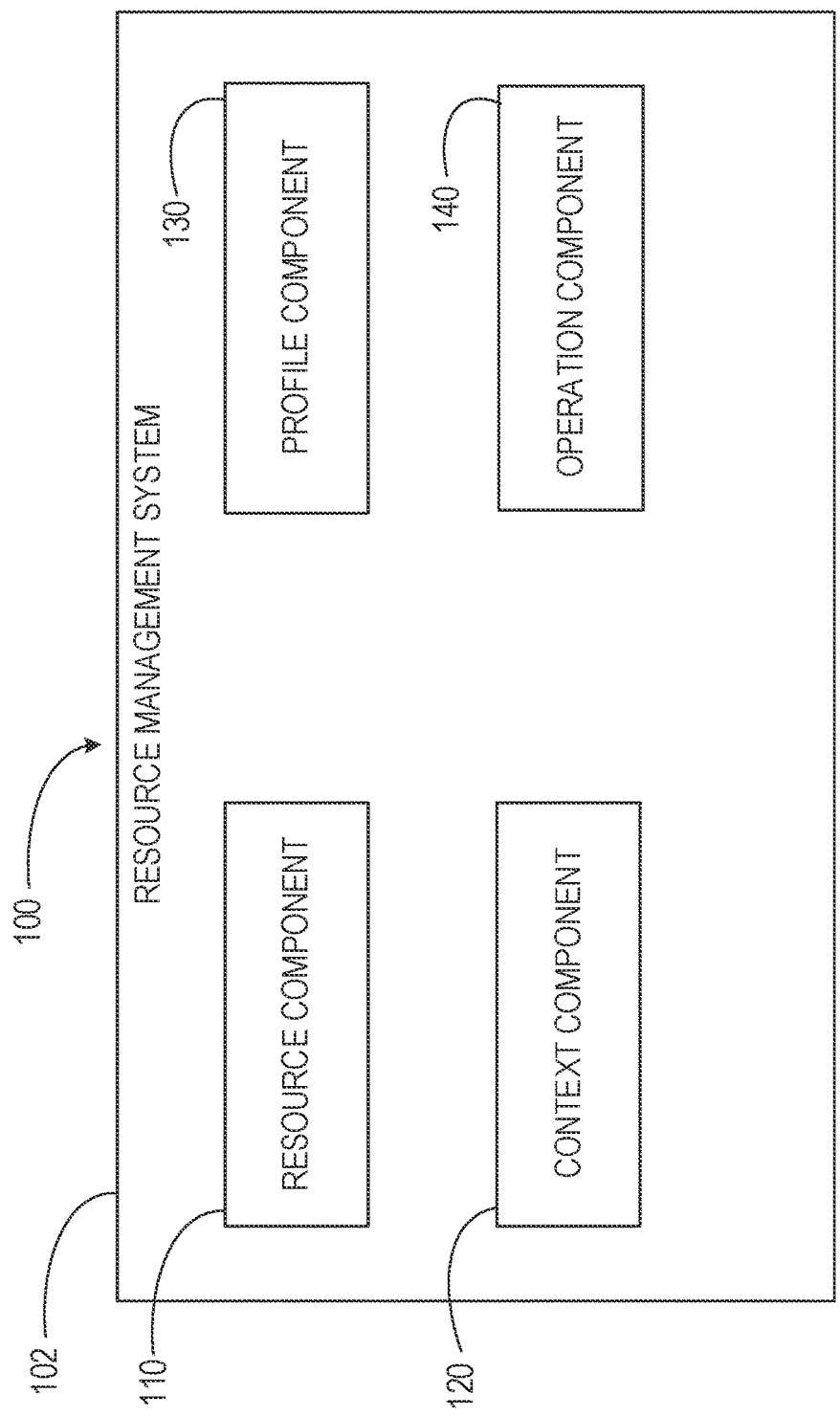
FIG. 1 depicts a block diagram of a computing environment for implementing concepts and computer-based methods, according to at least one embodiment.

The present disclosure relates generally to methods for preventing resource exploitation in mobile devices. More particularly, but not exclusively, embodiments of the present disclosure relate to a computer-implemented method for proactively limiting access to mobile device resources based on predicted usage and user contact engagement through dynamically generated policy modules. The present disclosure relates further to a related system for preventing resource exploitation in mobile devices, and a computer program product for operating such a system.

Mobile computing devices have resources that are limited compared to stationary or other larger computing devices. Mobile computing resources include computing resources, storage or memory space, battery power, and other resources on which mobile computing devices draw to perform operations requested by users. Applications may call on or consume resources in response to operations performed by a user on the mobile computing device or in response to a communication from another user transmitting messages, requests, or information, to the initial user's mobile computing device.

Mobile computing resources are often managed as an attempt to optimize and manage resources using user-selected permissions. Resource permissions are often categorized into differing types. For example, mobile operating systems may categorize different permissions into types, including install-time permissions, runtime/static permissions, and special permissions. Special permissions may be associated with specified applications available for current use on the mobile device and user interactions to available mobile resources. Permissions may define an application scope of accessing a mobile computing device's resource. Permissions may also restrict actions that can be performed on a mobile computing device by granting explicit permissions. Resource permissions may include varying degrees of functionality or granularity. As such, resource permissions may fall short in providing protection from exploiting permission capabilities. Further, These resource permissions are often selected by users for individual applications. Adjustment or changes to resource permissions are often manually performed by users at an individual application level. For example, some permissions may be relatively fine grain and allow a specific application to be instructed on whether a user desires to allow an application to auto-download media content received from contacts or third parties based on Wi-Fi connectivity. However, such a method of mobile resource control does not provide controls at other levels, such as consumption-based on a user's connection level. By way of further example, some permissions allow a user to grant a mobile application to access stored media and automatically download media received by the mobile application. A malicious user may exploit such permission to transmit large files, which are automatically downloaded. The malicious user may unnecessarily consume a user's mobile device storage space, battery life, internet data consumption, and processor bandwidth. Similarly, a malicious user may exploit a GPS location feature to share a false location to consume the internet bandwidth of a user's device. Current permission models do not provide control of internet bandwidth consumption at a user's connection level at a given point in time. Further, current permission models do not enable control of mobile resource consumption in a dynamic manner and are based on changing contexts of mobile computing devices, user connections, and currently running applications.

Embodiments of the present disclosure employ multi-layered security and mobile device resource-level access to dynamically determine resource usage and resource usage exploitation attempts. Embodiments of the present disclosure employ multi-layered security and mobile device resource-level access to dynamically manage consumption resources of a mobile computing device by mobile applications stored on the mobile computing device. In some embodiments, the present disclosure provides methods and systems which enable users to assign, define, and limit mobile device resources to be accessed by the user's contacts, third parties, third-party applications, or general mobile computing device use. Embodiments of the present disclosure prevent malicious actors from consuming mobile device resources by attempting to exploit policies or application permissions defined on a mobile device. Some embodiments of the present disclosure enable dynamic identification and management of device contexts and resource consumption contexts to address exploitation attempts by malicious actors in real-time or near real-time. Embodiments of the present disclosure combine application usage of identified connections and contacts of a user and application usage of mobile device resources to construct mobile consumption profiles. The mobile consumption profiles are dynamically generated based on observed user preferences. Embodiments of the present disclosure dynamically assign generated resource consumption profiles to mobile applications based on derived user requirements to limit access to scarce mobile resources.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a resource management system 102. The resource management system 102 may comprise a resource component 110, a context component 120, a profile component 130, and an operation component 140. The resource component 110 receives resource requests from mobile applications associated with a mobile computing device. The context component 120 determines device contexts and resource consumption contexts for a mobile computing device. The profile component 130 generates resource consumption profiles based on device contexts and resource consumption resources. The operation component 140 selects resource consumption profiles and manages consumption of resources by mobile applications based on selected resource consumption profiles. Although described with distinct components, it should be understood that, in at least some embodiments, components may be combined or divided, and/or additional components may be added without departing from the scope of the present disclosure.

Figure 2:
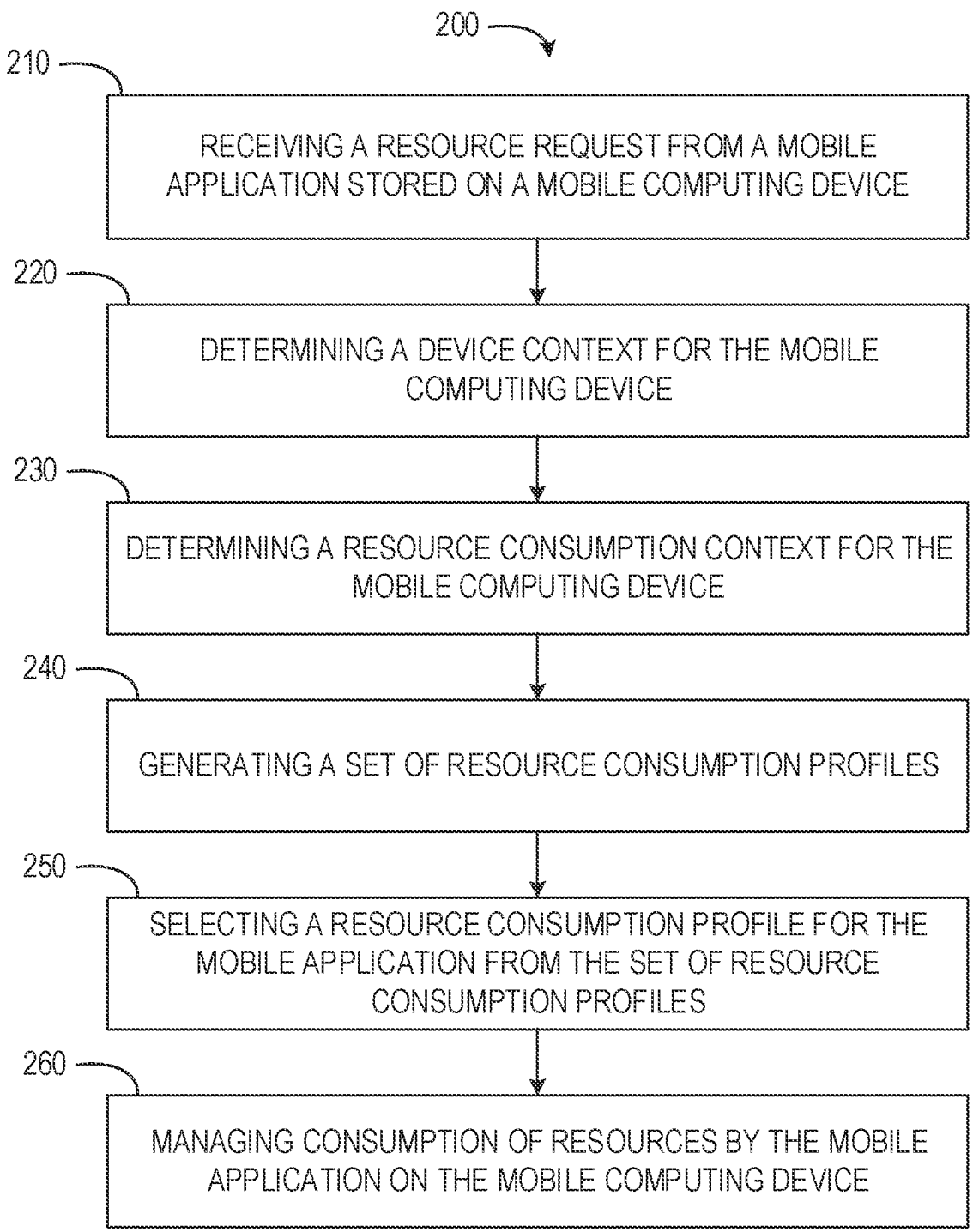
FIG. 2 depicts a flow diagram of a computer-implemented method for preventing resource exploitation in mobile devices, according to at least one embodiment.

Referring now to FIG. 2, a flow diagram of a computer-implemented method 200 is shown. The computer-implemented method 200 is a method for preventing resource exploitation in mobile devices. In some embodiments, the computer-implemented method 200 may be performed by one or more components of the computing environment 100, as described in more detail below.

At operation 210, the resource component 110 receives a resource request from a mobile application stored on a mobile computing device of a user (e.g., a first user). The resource request may be generated by the mobile application on the mobile computing device. The resource request may be received based on receipt of a message or communication at the mobile application. The resource request may be associated with a communicating user (e.g., a second user). The second user may be associated with a contact or contact profile stored within the mobile computing device.

Mobile applications on a mobile device may contain or maintain contact lists for individuals, organizations, or other computing device users with which a user of a given mobile computing device communicates. Contact lists maintained by one application or a contacts application may be shared or used by multiple mobile applications. For example, a contact application contact may be shared in a chat application, a mobile payment application, or a map application. Some mobile applications may maintain a separate contact list, such as a social media application. The resource component 110 may determine a contact associated with the resource request using one or more contact lists, including contact lists shared across mobile applications and contact lists maintained by distinct mobile applications.

At operation 220, the context component 120 determines a device context for the mobile computing device. The device context may indicate a location, connectivity, available networks, speed, or other circumstances of the mobile computing device. The device context may also indicate mobile resources available to the mobile computing device. Mobile resources may include central processing unit (CPU) capacity, CPU speed, available memory, memory speed, battery life, the current power draw on a battery, and other relevant and determinable mobile resources. In some instances, the device context includes or indicates data storage costs, data usage costs, data plan limits, and other attributes which influence mobile resource usage.

At operation 230, the context component 120 determines a resource consumption context for the mobile computing device. The resource consumption context may indicate a user's mobile device resource requirements at a given time or time period. In some embodiments, the resource consumption context is determined based on the device context. For example, the context component 120 may calculate or determine a power draw, a CPU usage, or other resource usage statistics for the mobile computing device based on attributes determined for the device context. In some instances, the resource consumption context is determined based on the resource consumption of one or more mobile applications operating on the mobile computing device. For example, the context component 120 may calculate resource usage for one or more resources used by the one or more mobile applications currently operating on the mobile computing device.

The resource consumption context may indicate a mobile computing device resource requirement at a particular time. For example, the resource consumption context may indicate a remote location of a mobile computing device, time-based events, currently active mobile applications, and other aspects of mobile computing device usage which may affect the mobile resource drain on the mobile computing device. By way of further example, the resource consumption context may indicate, using calendar information from a calendar application, a requirement for steady internet bandwidth, such as when a user is attending a meeting and sharing a presentation using the mobile computing device.

At operation 240, the profile component 130 generates a set of resource consumption profiles. In some embodiments, the set of resource consumption profiles are generated in response to the resource request. The set of resource consumption profiles may be generated based on the device context and resource consumption context. For example, the set of resource consumption profiles may be generated based on identified mobile device resources and user requirements at a given time. At least a portion of resource consumption profiles may be generated for resource consumption requirements at a given time, across a portion of time segments, or for all time periods of device operation of the mobile computing device. Each resource consumption profile may be a dynamic resource consumption profile. The set of resource consumption profiles may be continually modified by dynamic monitoring of the device context and resource consumption context. As such, any generated resource consumption profile may be dynamically added, modified, or removed from the set of resource consumption profiles based on a current device and resource consumption context or changes to one or more of the device context and the resource consumption context.

At operation 250, the operation component 140 selects a resource consumption profile for the mobile application from the set of resource consumption profiles. The operation component 140 may select the resource consumption profile as a lowest resource consumption which enables suitable communication based on the resource consumption context and device context. The operation component 140 may select the resource consumption profile as a resource consumption profile enabling suitable communication while also lowering resource consumption of other resource consumption profiles for contacts or mobile applications operating on the mobile computing device.

In some embodiments, the resource consumption profile is a first resource consumption profile of the set of resource consumption profiles. The first resource profile may be initially selected based on the resource request, the device context, and the resource consumption context.

At operation 260, the operation component 140 manages the consumption of resources by the mobile application on the mobile computing device. In some embodiments, the consumption of resources is managed based on the selected resource consumption profile.

In some embodiments, the operation component 140 manages the consumption of resources of one or more mobile applications. The operation component 140 may manage consumption resources of the one or more mobile applications operating on the mobile device relative to the mobile application associated with the resource request.

In some embodiments, the operation component 140 initially manages the consumption of resources by the selected resource consumption profile (e.g., the first resource consumption profile). The operation component 140, cooperating with the context component 120, detects a change in device context for the mobile computing device. The operation component 140 may also detect a change in the resource consumption context for the mobile computing device.

In response to detecting a change in one or more of the device context and the resource consumption context, the operation component 140 selects a second resource consumption profile for the mobile application.

The operation component 140 may then manage the consumption of resources by the mobile application on the mobile computing device based on the second resource consumption profile.

Figure 3:
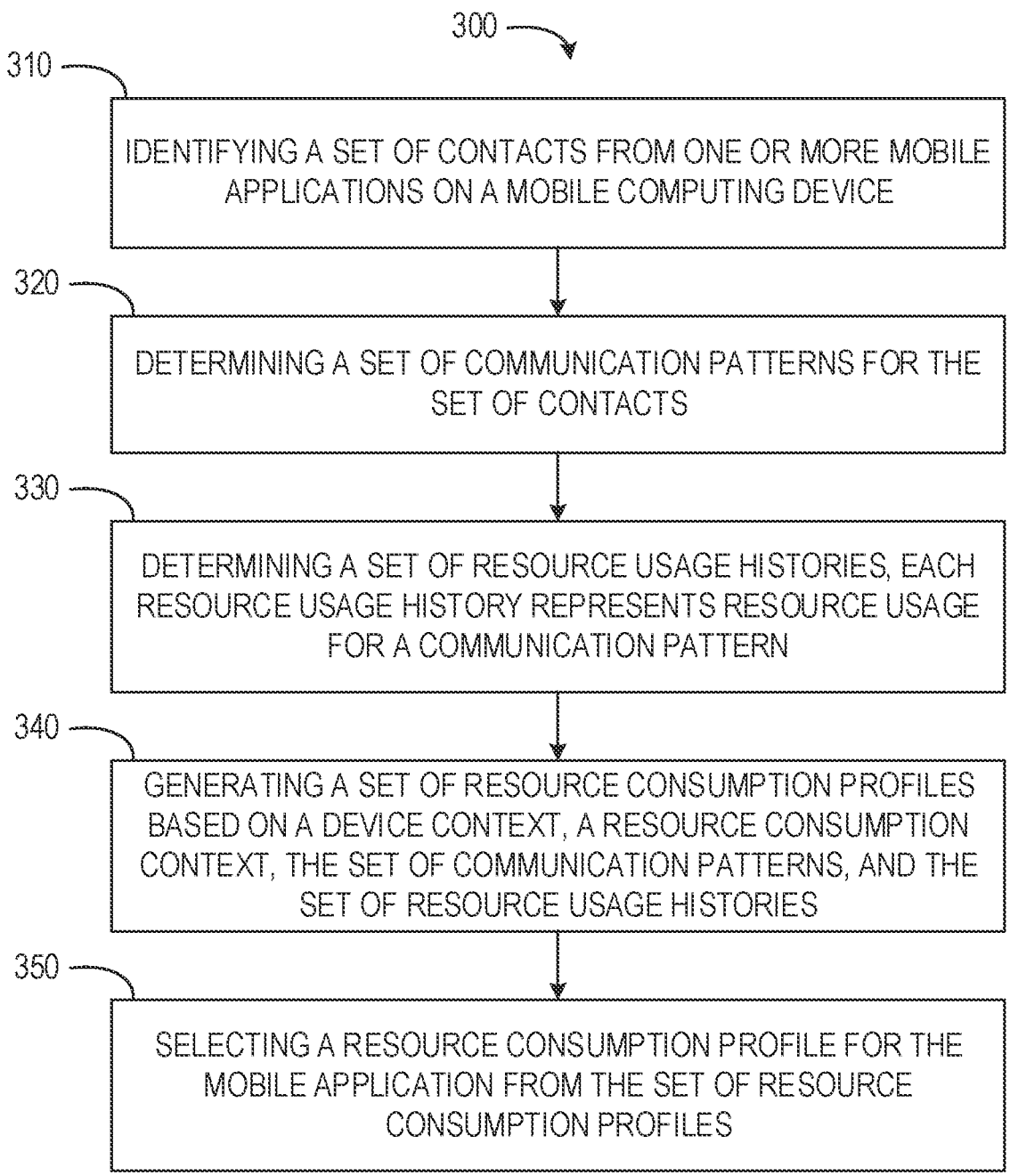
FIG. 3 depicts a flow diagram of a computer-implemented method for preventing resource exploitation in mobile devices, according to at least one embodiment.

FIG. 3 shows a flow diagram of an embodiment of a computer-implemented method 300 for preventing resource exploitation in mobile devices. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the profile component 130 identifies a set of contacts from one or more mobile applications on a mobile computing device. The mobile computing device may be associated with a first user. In some embodiments, the set of contacts represent contact information for a set of users associated with the first user. The set of contacts may be contained within storage allocated to a single mobile application, across a set of mobile applications, or in storage allocated for a contacts application of the mobile computing device. The set of contacts may be identified regardless of the mobile application which accesses or is associated with any individual contact or subset of contacts.

In operation 320, the profile component 130 determines a set of communication patterns for the set of contacts. In some embodiments, each communication pattern represents a communication pattern of the first user with a user of the set of users. The profile component 130 may determine the set of communication patterns by identifying communication attributes of historical communication between the first user and users of the set of users. Communication attributes may include a time of communication, duration of communication, frequency of communication, mobile applications used during communication, combinations thereof, or other relevant and suitable attributes of communications of the first user. Each communication pattern may represent historical communications of the first user and another user to anticipate mobile device usage based on users associated with contacts stored within the mobile computing device.

In operation 330, the profile component 130 determines a set of resource usage histories. In some embodiments, each resource usage history represents resource usage for a communication pattern of the set of communication patterns. The resource usage history may indicate resource consumption of the communication history between the first user and a user associated with each communication pattern. In some instances, the resource usage history calculates resource usage performed by an application used to communicate between the first user and another user. The resource usage history may also take into consideration other applications used by the first user during communication with another user. The resource usage history may also include locations, times, networks, and other communication factors associated with each communication pattern between the first user and another given user.

In operation 340, the profile component 130 generates a set of resource consumption profiles. In some embodiments, the set of resource consumption profiles are generated based on a device context, a resource consumption context, the set of communication patterns, and the set of resource usage histories. Each resource consumption profile may be initially assigned to a contact of the set of contacts associated with a communication pattern and resource usage history associated with the contact. In some instances, a resource consumption profile assigned to a given contact of the set of contacts, may be a default resource consumption profile. The default resource consumption profile may be assigned to the contact until a communication pattern, and a resource usage history are established for the contact.

In operation 350, the operation component 140 selects a resource consumption profile for the mobile application from the set of resource consumption profiles. In some instances, the resource consumption profile is a default resource consumption profile. For example, a default resource consumption profile may be used where a contact associated with a resource request is not initially in a contact list of the mobile computing device. In some instances, the resource consumption profile is a resource consumption profile associated with a contact associated with a resource request. In some instances, the resource consumption profile is a resource consumption profile associated with a mobile application associated with a resource request. In some instances, the resource consumption profile is selected based on an importance or relationship of the contact associated with the resource request to the first user. The resource consumption profile may also be selected based on a current resource usage of the mobile computing device. The resource consumption profile may also be selected based on a time, time frame, or time segment. In such instances, the operation component 140 may change the selected resource consumption profile to another resource consumption profile at a termination of a time segment or time frame. In some instances, the resource consumption profile may be selected based on one or more of the considerations, factors, or attributed described above.

Where the selected resource consumption profile is associated with a contact associated with the resource request, the operation component 140 may select the resource consumption profile using one or more operations. In some embodiments, the operation component 140 selects the resource consumption profile by identifying a second user. The second user is associated with a resource request from the mobile application. The operation component 140 may determine a contact position of the second user within the set of contacts. The contact position may be a position within a contact list organized or ordered based on importance, relationship type, or any other suitable metric. The operation component 140 may identify a resource consumption profile from the set of resource consumption profiles. The resource consumption profile may be identified based on the contact position of the second user, the device context, and the resource consumption context.

For example, the operation component 140 may identify a mobile computing device context indicating travel to a distant location for interaction with a contact. The operation component 140 may identify a user's communication pattern with the contact, whether the contact previously exists in a contact list or is a new person or contact. The operation component 140 may use voice communications or recordings, which the first user has allowed for use by the operation component 140, to determine that communication with the contact is required for the duration of travel. In such instances, the operation component 140 assigns a high mobile device consumption profile for a specified period of time, a duration of travel (e.g., until the mobile computing device arrives at a selected location), or until another suitable endpoint is met. The operation component 140 may also demote resource consumption profiles for other contacts or mobile applications to a low-level resource consumption profile until the endpoint is met.

The default resource consumption profile may be overridden to a specified resource consumption profile, a resource consumption profile for a level of importance or contact type, or any other suitable and relevant resource consumption profile by the first user of the mobile computing device. The first user may override the initial default resource consumption profile by assigning a level of importance or relationship type to the contact, assigning a subsequent consumption profile, changing current resource consumption of the mobile computing device, combinations thereof, or any other suitable manner.

Figure 4:
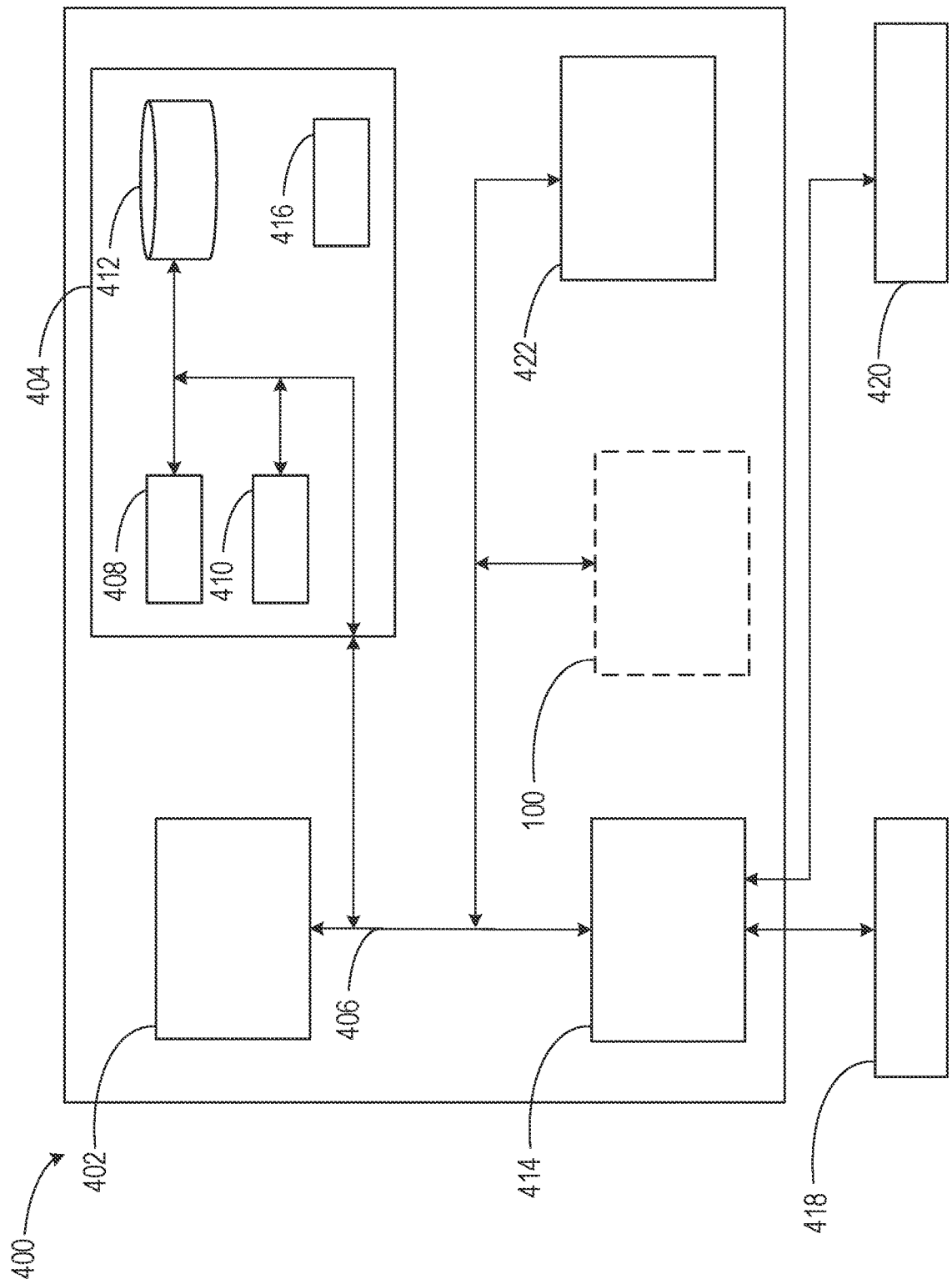
FIG. 4 depicts a block diagram of a computing system for preventing resource exploitation in mobile devices, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for preventing resource exploitation in mobile devices.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the resource component 110, the context component 120, the profile component 130, and the operation component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
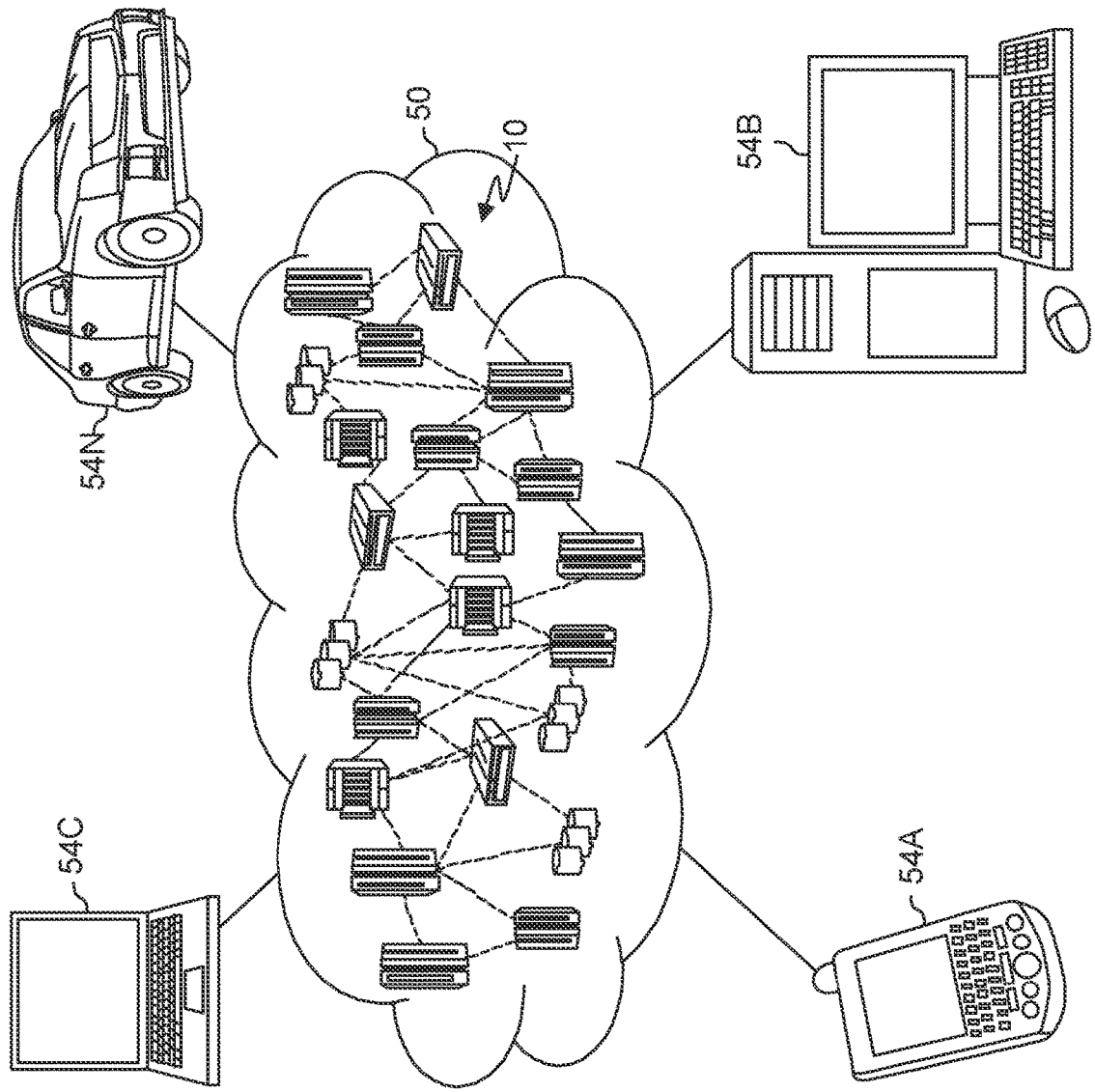
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
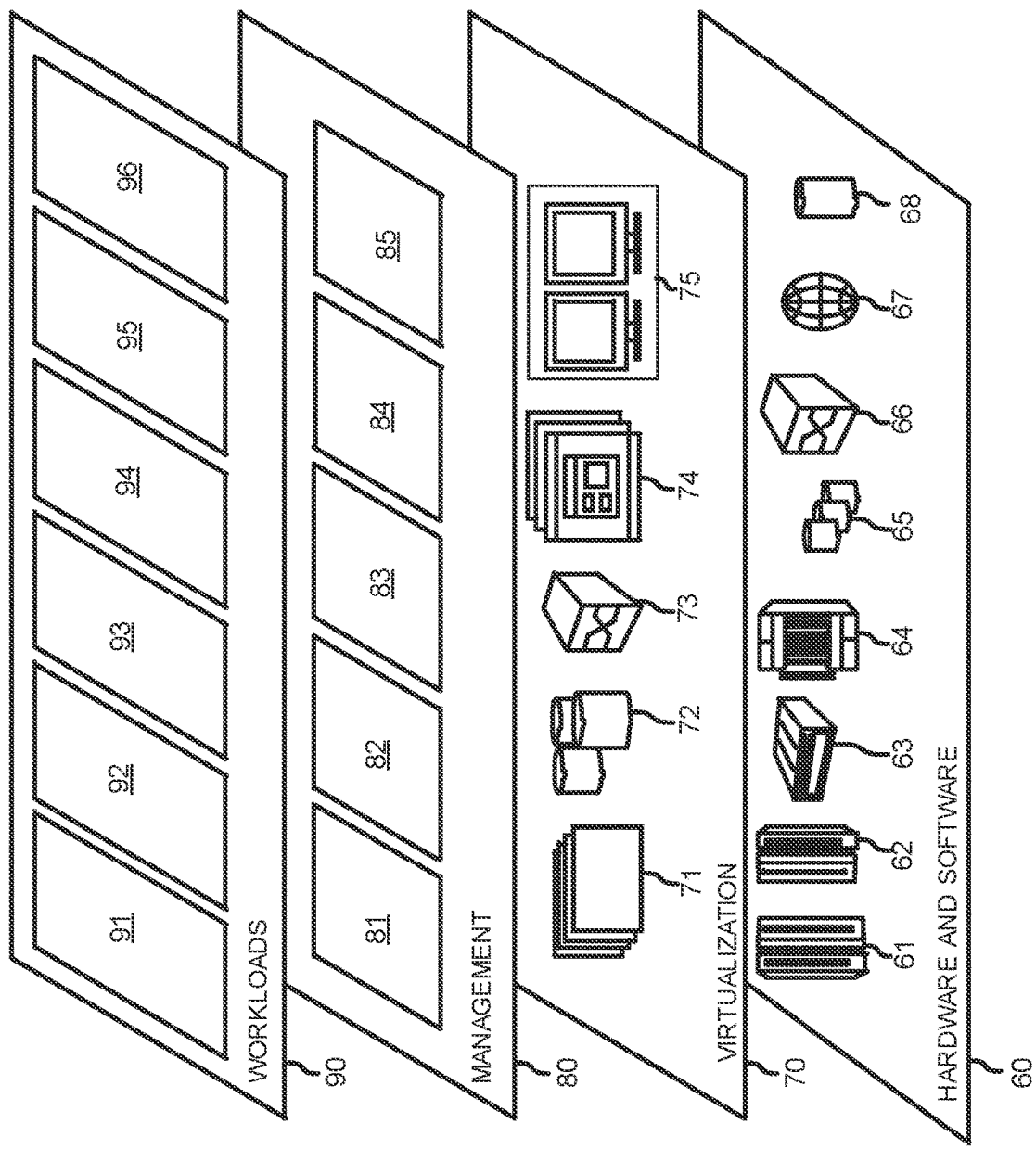
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a resource request from a mobile application stored on a mobile computing device;
   determining a device context for the mobile computing device;
   determining a resource consumption context for the mobile computing device based on the device context and resource consumption of one or more mobile applications operating on the mobile computing device;
   determining a set of communication patterns between a first user of the mobile communication device and a set of contacts that are second users associated with the first user;
   determining contact positions for the set of contacts that are based on at least one of the communication patterns, a relationship type of the contact to the user, a contact type, and a level of importance of the contact;
   in response to the resource request, generating a set of resource consumption profiles based on the device context, the resource consumption context, the set of communication patterns, and the contact positions;
   selecting a resource consumption profile for the mobile application from the set of resource consumption profiles; and
   managing consumption of resources, of the mobile computing device, by the mobile application based on the selected resource consumption profile.

2. The method of claim 1, further comprising:
   identifying the set of contacts from the one or more mobile applications on the mobile computing device, the set of contacts including contact information of the second users and
   determining a set of resource usage histories, each resource usage history representing resource usage for a communication pattern of the set of communication patterns.

3. The method of claim 2, wherein the set of resource consumption profiles are further based on the set of resource usage histories.

4. The method of claim 1, wherein the resource consumption profile is a first resource consumption profile of the set of resource consumption profiles, the method further comprising:
   detecting a change in the device context for the mobile computing device;
   selecting a second resource consumption profile for the mobile application; and
   managing consumption of resources, of the mobile computing device, by the mobile application based on the second resource consumption profile.

5. The method of claim 1, wherein the resource consumption profile is a first resource consumption profile of the set of resource consumption profiles, the method further comprising:
   detecting a change in the resource consumption context for the mobile computing device;
   selecting a second resource consumption profile for the mobile application; and
   managing consumption of resources, of the mobile computing device, by the mobile application based on the second resource consumption profile.

6. The method of claim 1, further comprising:
   managing consumption of resources of the one or more mobile applications operating on the mobile computing device relative to the mobile application associated with the resource request.

7. A system, comprising:
   one or more processors; and a computer-readable storage medium, coupled to the one or more processors, storing program instructions that, when executed by the one or more processors, cause the one or more processors to perform operations comprising:
   receiving a resource request from a mobile application stored on a mobile computing device;

determining a device context for the mobile computing device;

determining a resource consumption context for the mobile computing device based on the device context and resource consumption of one or more mobile applications operating on the mobile computing device;

determining a set of communication patterns between a first user of the mobile communication device and a set of contacts that are second users associated with the first user;

determining contact positions for the set of contacts that are based on at least one of the communication patterns, a relationship type of the contact to the user, a contact type, and a level of importance of the contact;

in response to the resource request, generating a set of resource consumption profiles based on the device context, the resource consumption context, the set of communication patterns, and the contact positions;

selecting a resource consumption profile for the mobile application from the set of resource consumption profiles; and managing consumption of resources, of the mobile computing device, by the mobile application based on the selected resource consumption profile.

8. The system of claim 7, further comprising:

identifying the set of contacts from the one or more mobile applications on the mobile computing device, the set of contacts including contact information of the second users and determining a set of resource usage histories, each resource usage history representing resource usage for a communication pattern of the set of communication patterns.

9. The system of claim 8, wherein the set of resource consumption profiles are further based on the set of resource usage histories.

10. The system of claim 7, wherein the resource consumption profile is a first resource consumption profile of the set of resource consumption profiles, the operations further comprising:

detecting a change in the device context for the mobile computing device;

selecting a second resource consumption profile for the mobile application; and managing consumption of resources, of the mobile computing device, by the mobile application based on the second resource consumption profile.

11. The system of claim 7, wherein the resource consumption profile is a first resource consumption profile of the set of resource consumption profiles, the operations further comprise:

detecting a change in the resource consumption context for the mobile computing device;

selecting a second resource consumption profile for the mobile application; and managing consumption of resources, of the mobile computing device, by the mobile application based on the second resource consumption profile.

12. The system of claim 7, wherein the operations further comprise:

managing consumption of resources of the one or more mobile applications operating on the mobile computing device relative to the mobile application associated with the resource request.

13. A computer program product comprising a computer readable storage medium having program instructions embodied therewith, the program instructions being executable by one or more processors to cause the one or more processors to perform operation system, comprising:

one or more processors; and a computer-readable storage medium, coupled to the one or more processors, storing program instructions that, when executed by the one or more processors, cause the one or more processors to perform operations comprising:

receiving a resource request from a mobile application stored on a mobile computing device;

determining a device context for the mobile computing device;

determining a resource consumption context for the mobile computing device based on the device context and resource consumption of one or more mobile applications operating on the mobile computing device;

determining a set of communication patterns between a first user of the mobile communication device and a set of contacts that are second users associated with the first user;

determining contact positions for the set of contacts that are based on at least one of the communication patterns, a relationship type of the contact to the user, a contact type, and a level of importance of the contact;

in response to the resource request, generating a set of resource consumption profiles based on the device context, and the resource consumption context, the set of communication patterns, and the contact positions;

selecting a resource consumption profile for the mobile application from the set of resource consumption profiles; and managing consumption of resources, of the mobile computing device, by the mobile application based on the selected resource consumption profile.

14. The computer program product of claim 13, further comprising:

identifying the set of contacts from the one or more mobile applications on the mobile computing device, the set of contacts including contact information of the second users and determining a set of resource usage histories, each resource usage history representing resource usage for a communication pattern of the set of communication patterns.

15. The computer program product of claim 13, wherein the resource consumption profile is a first resource consumption profile of the set of resource consumption profiles, the operations further comprise:

detecting a change in the device context for the mobile computing device;

selecting a second resource consumption profile for the mobile application; and managing consumption of resources, of the mobile computing device, by the mobile application based on the second resource consumption profile.

16. The computer program product of claim 13, wherein the resource consumption profile is a first resource consumption profile of the set of resource consumption profiles, the operations further comprise:

detecting a change in the resource consumption context for the mobile computing device;

selecting a second resource consumption profile for the mobile application; and managing consumption of resources, of the mobile computing device, by the mobile application based on the second resource consumption profile.

17. The computer program product of claim 13, wherein the operations further comprise:

managing consumption of resources of the one or more mobile applications operating on the mobile computing device relative to the mobile application associated with the resource request.

\* \* \* \* \*